United States Patent
Lee et al.

(10) Patent No.: US 11,699,554 B2
(45) Date of Patent: *Jul. 11, 2023

(54) MULTI-LAYERED CERAMIC ELECTRONIC COMPONENT

(71) Applicant: SAMSUNG ELECTRO-MECHANICS CO., LTD., Suwon-si (KR)

(72) Inventors: Jang Yeol Lee, Suwon-si (KR); Jin Soo Park, Suwon-si (KR); Ji Hong Jo, Suwon-si (KR); Myung Jun Park, Suwon-si (KR); Hyun Hee Gu, Suwon-si (KR); Jong Ho Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/726,908

(22) Filed: Apr. 22, 2022

(65) Prior Publication Data
US 2022/0246360 A1    Aug. 4, 2022

Related U.S. Application Data

(63) Continuation of application No. 16/872,678, filed on May 12, 2020, now Pat. No. 11,342,123.

(30) Foreign Application Priority Data

Jun. 27, 2019    (KR) .................. 10-2019-0077325

(51) Int. Cl.
*H01G 4/30*    (2006.01)
*H01G 4/12*    (2006.01)
(Continued)

(52) U.S. Cl.
CPC .............. *H01G 4/30* (2013.01); *H01G 4/012* (2013.01); *H01G 4/1227* (2013.01); *H01G 4/248* (2013.01)

(58) Field of Classification Search
CPC ...... H01G 4/248; H01G 4/012; H01G 4/1209; H01G 4/232; H01G 4/30; H01G 4/0085;
(Continued)

(56) References Cited

U.S. PATENT DOCUMENTS 9,087,644 B2    7/2015    Jeon et al.
9,165,712 B2    10/2015   Jeon et al.
(Continued)

FOREIGN PATENT DOCUMENTS

CN    103219150 A    7/2013
CN    103219151 A    7/2013
(Continued)

OTHER PUBLICATIONS

Korean Office Action dated Aug. 10, 2020 issued in Korean Patent Application No. 10-2019-0077325 (with English translation).
(Continued)

*Primary Examiner* — Michael P McFadden
(74) *Attorney, Agent, or Firm* — Morgan, Lewis & Bockius LLP

(57) ABSTRACT

A multilayer ceramic electronic component includes a ceramic body including a dielectric layer and a plurality of internal electrodes disposed to oppose each other with the dielectric layer interposed therebetween, and an external electrode formed outside the ceramic body. The external electrode includes an electrode layer, and a thickness T1 of the electrode layer corresponding to a central region of the ceramic body in a thickness direction is 5 μm or more and 30 μm or less, a thickness T2 of the electrode layer corresponding to a region in which an outermost internal elec-
(Continued)

trode is located is 5 μm or more and 15 μm or less, and a thickness T3 of the electrode layer corresponding to a corner portion of the ceramic body is 0.1 μm or more and 10 μm or less.

20 Claims, 4 Drawing Sheets

(51) Int. Cl.
 *H01G 4/012* (2006.01)
 *H01G 4/248* (2006.01)
(58) Field of Classification Search
 CPC .... H01G 4/1227; H01G 4/2325; H01G 4/065; H01G 4/005; H01G 4/12; H01G 4/181
 See application file for complete search history.

(56) References Cited

U.S. PATENT DOCUMENTS

| | | | |
|---|---|---|---|
| 9,892,855 B2 | 2/2018 | Ando et al. | |
| 11,342,123 B2* | 5/2022 | Lee | H01G 4/248 |
| 2011/0038097 A1 | 2/2011 | Matsuda et al. | |
| 2013/0182368 A1 | 7/2013 | Jeon et al. | |
| 2013/0182369 A1 | 7/2013 | Jeon et al. | |
| 2016/0196922 A1* | 7/2016 | Omori | H01G 4/008 361/301.4 |
| 2016/0268046 A1 | 9/2016 | Nishisaka et al. | |
| 2017/0018359 A1 | 1/2017 | Kimura et al. | |
| 2017/0098505 A1* | 4/2017 | Ando | H01G 4/232 |
| 2017/0271083 A1* | 9/2017 | Makino | H01G 4/30 |
| 2017/0301470 A1* | 10/2017 | Asai | H01G 4/232 |
| 2018/0053601 A1* | 2/2018 | Sakatsume | H01G 4/30 |
| 2018/0082792 A1* | 3/2018 | Satoh | H01G 4/232 |
| 2018/0190435 A1* | 7/2018 | Kishi | H01G 4/30 |
| 2018/0240598 A1 | 8/2018 | Tanaka et al. | |

FOREIGN PATENT DOCUMENTS

| | | |
|---|---|---|
| CN | 107039180 A | 8/2017 |
| JP | H06-224073 A | 8/1994 |
| JP | 2012-004480 A | 1/2012 |
| JP | 2012-199597 A | 10/2012 |
| JP | 2013-149939 A | 8/2013 |
| KR | 10-2013-0084852 A | 7/2013 |
| KR | 10-2013-0084853 A | 7/2013 |
| KR | 10-2017-0009777 A | 1/2017 |
| KR | 10-1800212 B1 | 11/2017 |
| KR | 10-2018-0067482 A | 6/2018 |

OTHER PUBLICATIONS

Chinese Office Action dated Sep. 29, 2022, issued in corresponding Chinese Patent Application No. 202010607665.4 (with English Translation).

* cited by examiner

MULTI-LAYERED CERAMIC ELECTRONIC COMPONENT

CROSS-REFERENCE TO RELATED APPLICATION(S)

This application is the continuation application of U.S. patent application Ser. No. 16/872,678 filed on May 12, 2020, now U.S. Pat. No. 11,342,123, which claims benefit of priority to Korean Patent Application No. 10-2019-0077325 filed on Jun. 27, 2019 in the Korean Intellectual Property Office, the disclosure of which is incorporated herein by reference in its entirety.

TECHNICAL FIELD

The present disclosure relates to a multilayer ceramic electronic component, and more particularly, to a method of manufacturing a multilayer ceramic electronic component having excellent reliability.

BACKGROUND

In general, an electronic component using a ceramic material such as capacitors, inductors, piezoelectric elements, varistors, thermistors, or the like, includes a ceramic body formed of a ceramic material, an internal electrode formed in the ceramic body, and an external electrode disposed on a surface of the ceramic body to be connected to the internal electrode.

A multilayer ceramic capacitor, of a multilayer ceramic electronic component, may include a plurality of dielectric layers, internal electrodes disposed to oppose each other with a dielectric layer interposed therebetween, and an external electrode electrically connected to the internal electrode.

A multilayer ceramic capacitor is widely used as a component of a mobile communications device such as a computer, a PDA, a mobile phone, or the like, due to having a small size, high capacity, and ease of mounting.

In recent years, to implement high-performance as well as lightweight, thin, short, and small devices within the electrical and electronic equipment industry, miniaturization, high performance, and ultra-high capacity have been required for an electronic component.

In detail, according to the high capacity and miniaturization of a multilayer ceramic capacitor, a technique to significantly increase the capacitance per unit volume is required.

Thus, in the case of an internal electrode, it is required that an area is increased while a volume is significantly reduced. In this case, a high capacity is required to be implemented by increasing the stacking number of layers.

However, according to the high capacity and miniaturization of a multilayer ceramic capacitor, reliability, in detail, moisture resistance reliability is required to be secured.

SUMMARY

An aspect of the present disclosure is to provide a multilayer ceramic electronic component, and particularly, to a method of manufacturing a multilayer ceramic electronic component having excellent reliability.

According to an aspect of the present disclosure, a multilayer ceramic electronic component includes a ceramic body including a dielectric layer and a plurality of internal electrodes disposed to oppose each other with the dielectric layer interposed therebetween, and having a first surface and a second surface opposing each other in a thickness direction of the ceramic body, a third surface and a fourth surface connected to the first surface and the second surface, and opposing each other in a length direction of the ceramic body, and a fifth surface and a sixth surface connected to the first surface to the fourth surface, and opposing each other in a width direction of the ceramic body, and an external electrode disposed outside the ceramic body, and electrically connected to the internal electrode. The external electrode includes an electrode layer electrically connected to one or more of the plurality of internal electrodes, a first plating layer disposed on the electrode layer, and a second plating layer disposed on the first plating layer, and in a cross-section of the ceramic body in first and second directions, a thickness T1 of the electrode layer corresponding to a central region of the ceramic body in the thickness direction is 5 μm or more and 30 μm or less, a thickness T2 of the electrode layer corresponding to a region in which an outermost internal electrode, of the internal electrode, is located is 5 μm or more and 15 μm or less, and a thickness T3 of the electrode layer corresponding to a corner portion of the ceramic body is 0.1 μm or more and 10 μm or less.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
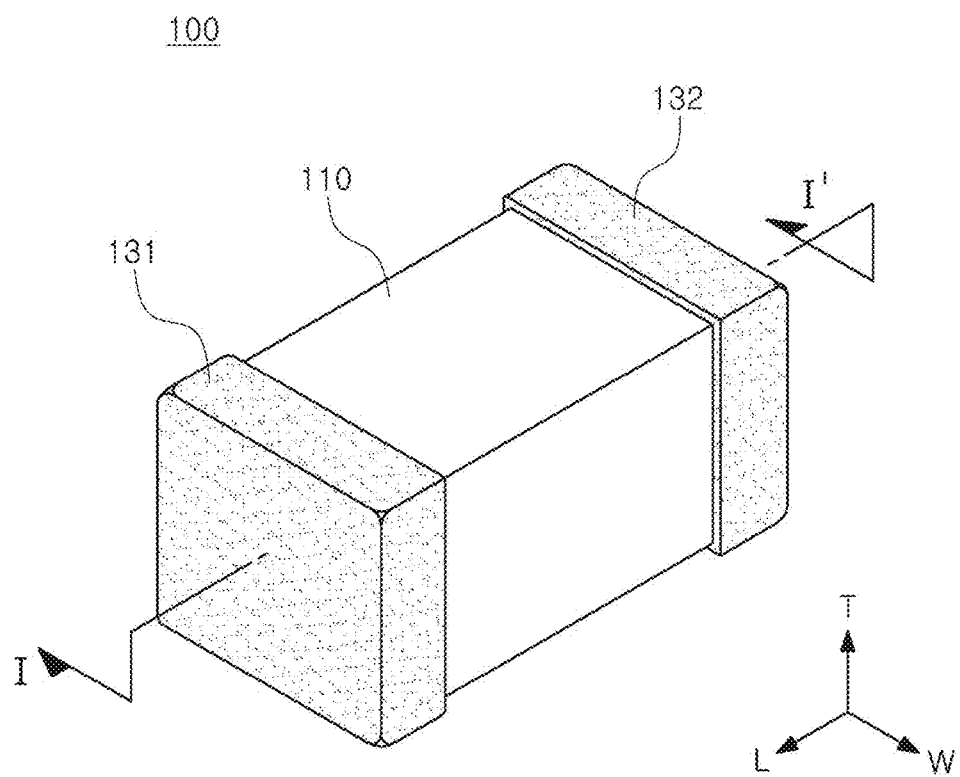
FIG. 1 is a schematic perspective view illustrating a multilayer ceramic capacitor according to an embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

The present invention relates to a ceramic electronic component, and an electronic component including a ceramic material may be a capacitor, an inductor, a piezoelectric element, a varistor, a thermistor, or the like. A multilayer ceramic capacitor as an example of a ceramic electronic component will be described below.

FIG. 1 is a schematic perspective view illustrating a multilayer ceramic capacitor according to an embodiment.

Figure 2:
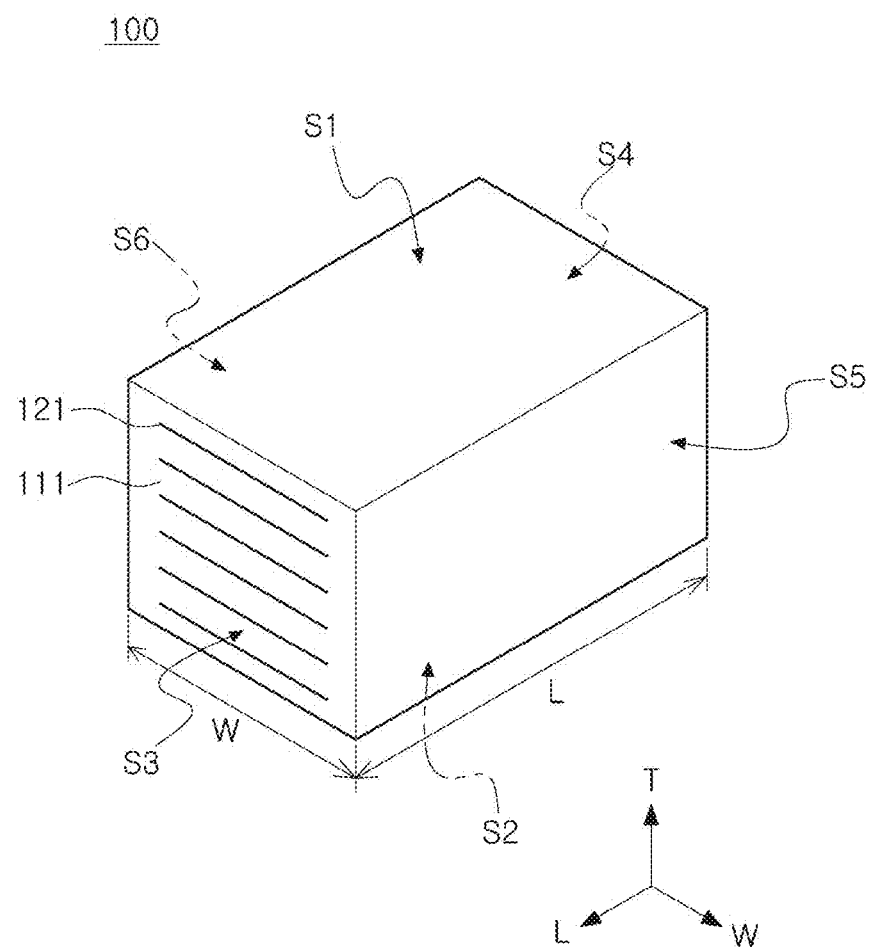
FIG. 2 is a schematic view illustrating a ceramic body according to an embodiment of the present disclosure.

FIG. 2 is a schematic view illustrating a ceramic body according to an embodiment of the present disclosure.

Figure 3:
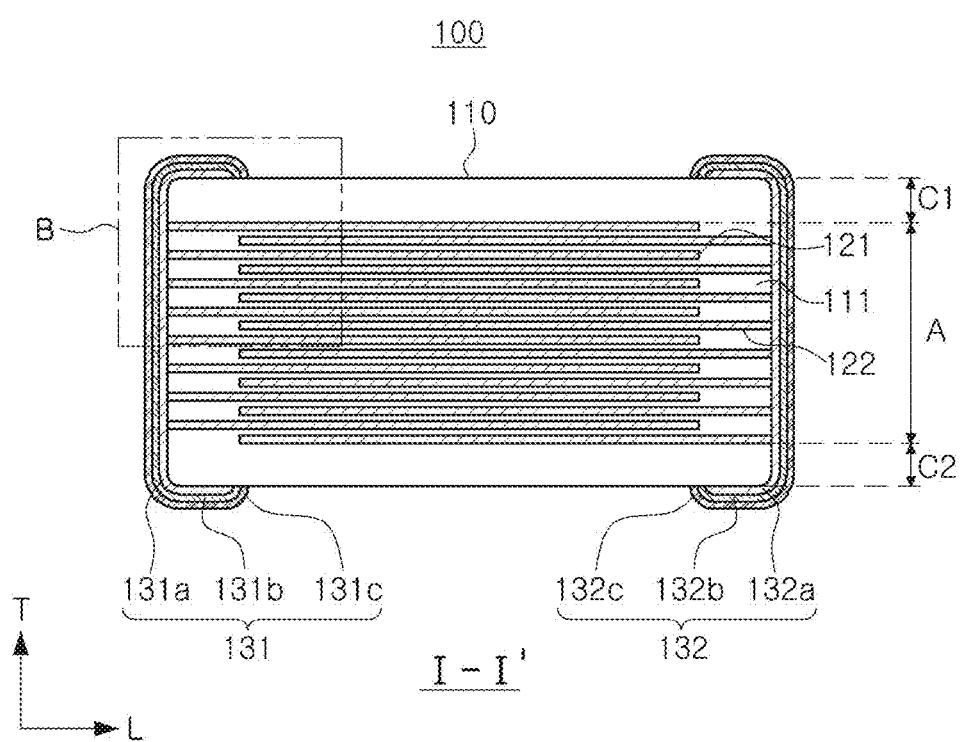
FIG. 3 is a cross-sectional view taken along line I-I' of FIG. 1.

FIG. 3 is a cross-sectional view taken along line I-I' of FIG. 1.

Figure 4:
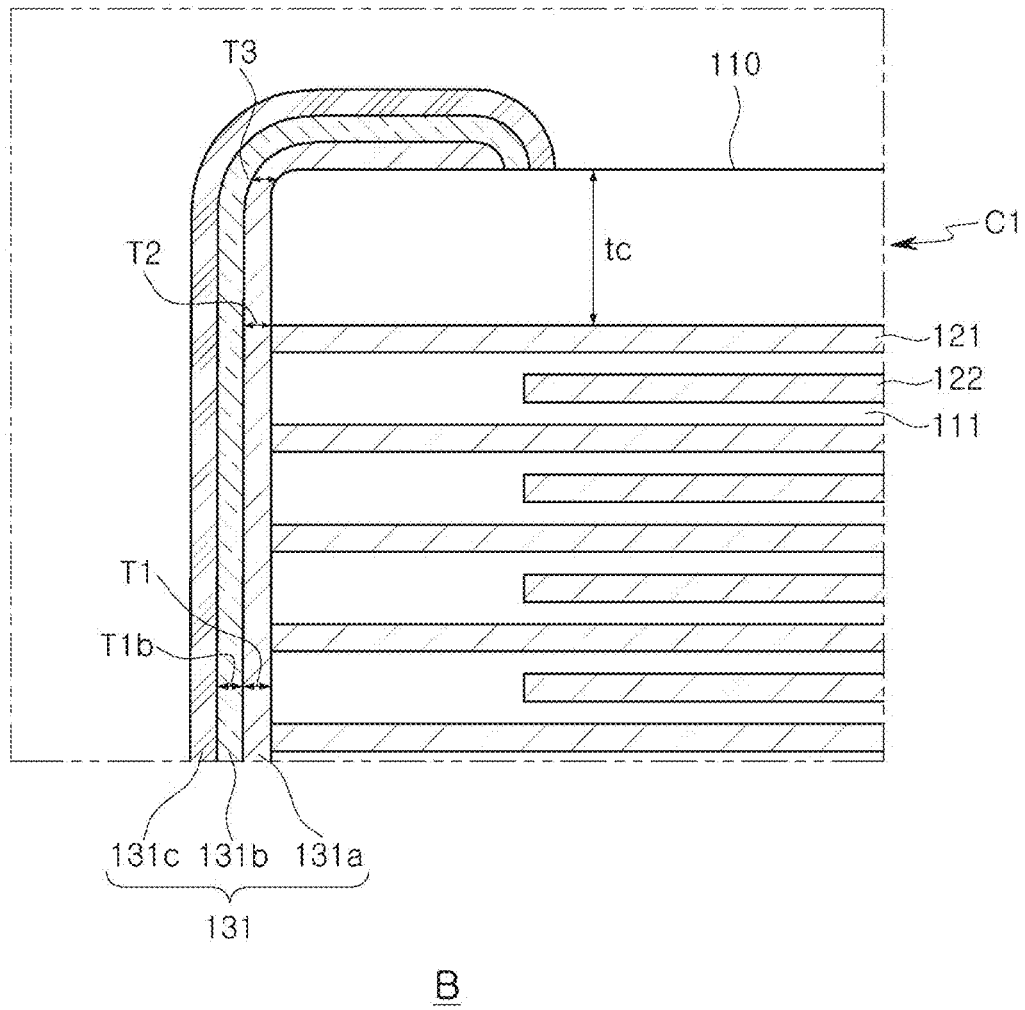
FIG. 4 is an enlarged view of region 'B' of FIG. 3.

FIG. 4 is an enlarged view of region 'B' of FIG. 3.

Referring to FIGS. 1 to 4, a multilayer ceramic capacitor according to an embodiment may include a ceramic body 110, internal electrodes 121 and 122 formed inside the ceramic body 100, and external electrodes 131 and 132 formed outside the ceramic body 110.

In an embodiment, a 'length direction' of a multilayer ceramic capacitor is defined as an 'L' direction, a 'width direction' is defined as a 'W' direction, and a 'thickness direction' is defined as a 'T' direction of FIG. 1. The 'thickness direction' may be used as a direction in which dielectric layers are stacked, that is, a 'stacking direction.'

A form of the ceramic body 110 is not particularly limited, but the ceramic body may have a hexahedral form, according to an embodiment.

The ceramic body 110 may include a first surface S1 and a second surface S2, opposing each other in a first direction, a third surface S3 and a fourth surface S4, connected to the first surface S1 and the second surface S2, and opposing each other in a second direction, and a fifth surface S5 and a sixth surface S6, connected to the first surface to the fourth surface S1 to S4, and opposing each other in a third direction.

The first surface S1 and the second surface S2 may be defined as surfaces opposing each other in a thickness direction of the ceramic body 110, a first direction, the third surface S3 and the fourth surface S4 may be defined as surfaces opposing each other in a length direction, a second direction, and the fifth surface S5 and the sixth surface S6 may be defined as surfaces opposing each other in a width direction, a third direction.

One end of each of a plurality of internal electrodes 121 and 122, formed inside the ceramic body 110, is exposed to the third surface S3 or the fourth surface S4 of the ceramic body 110.

The internal electrodes 121 and 122 may be provided as a pair of internal electrodes, including a first internal electrode 121 and a second internal electrode 122, having different polarities.

One end of the first internal electrode 121 is exposed to the third surface S3, and one end of the second internal electrode 122 is exposed to the fourth surface S4.

The other ends of the first internal electrode 121 and the second internal electrode 122 may be formed at a regular interval from the fourth surface S4 or the third surface S3.

First and second external electrodes 131 and 132 are formed on the third surface S3 and the fourth surface S4 of the ceramic body 110 to be electrically connected to the first and second internal electrodes 121 and 122, respectively.

Thicknesses of the first and second internal electrodes 121 and 122 are not particularly limited, but may be equal to 0.4 μm or less, by way of example.

According to an embodiment, a dielectric layer with an internal electrode formed therein may be stacked in an amount of 200 layers or more.

According to an embodiment, the ceramic body 110 may be formed by stacking a plurality of dielectric layers 111.

The plurality of dielectric layers 111, forming the ceramic body 110, are sintered, so boundaries between adjacent dielectric layers may be integrated and may not be readily identified with the naked eye.

The dielectric layer 111 may be formed by sintering a ceramic green sheet including ceramic powder.

The ceramic powder is not particularly limited as long as it is generally used in the art.

It is not particularly limited, and the ceramic powder may include, for example, $BaTiO_3$-based ceramic powder.

The $BaTiO_3$-based ceramic powder is not particularly limited, and may be $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which a portion such as Ca, Zr, or the like is dissolved in $BaTiO_3$, by way of example.

Moreover, the ceramic green sheet may include a transition metal, a rare earth element, Mg, Al, or the like, together with the ceramic powder.

A thickness of the dielectric layer 111 may be varied as appropriate to the capacity design of a multilayer ceramic capacitor.

It is not particularly limited, and a thickness of the dielectric layer 111, formed between two adjacent internal electrode layers, may be 0.4 µm or less, by way of example.

In an embodiment, a thickness of the dielectric layer 111 refers to an average thickness.

The average thickness of the dielectric layer 111 may be measured by scanning a cross-section of the ceramic body 110 in a length direction as illustrated in FIG. 2 as an image using a scanning electron microscope (SEM).

For example, as illustrated in FIG. 2, regarding on any dielectric layer extracted from an image in which a cross-section, obtained by cutting a central portion of the ceramic body 110 in a width (W) direction, is scanned in a length-thickness direction (L-T) using a scanning electron microscope (SEM), a thickness of equally-spaced 30 points is measured in a length direction to measure an average value.

The measurement of the equally-spaced 30 points may be performed in a capacitance forming portion referring to a region in which the internal electrodes 121 and 122 are overlapped.

Moreover, regarding the measurement of the average value, when an average value is measured using 10 or more dielectric layers, an average thickness of a dielectric layer may be further generalized.

The ceramic body 110 may include an active portion A, as a portion contributing to the capacity formation of the capacitor, as well as an upper cover portion C1 and a lower cover portion C2, formed in upper and lower portions of the active portion A, as upper and lower margin portions.

The active portion A may be formed by repeatedly stacking a plurality of first and second internal electrodes 121 and 122 with the dielectric layer 111 interposed therebetween.

The upper cover portion C1 and the lower cover portion C2 may have the same material and configuration as those of the dielectric layers 111 except that the upper cover portion C1 and the lower cover portion C2 do not include internal electrodes.

That is, the upper cover portion C1 and the lower cover portion C2 include a ceramic material, and may include, for example, a barium titanate ($BaTiO_3$)-based ceramic material.

The upper cover portion C1 and the lower cover portion C2 may be formed by stacking a single dielectric layer or two or more dielectric layers on upper and lower surfaces of the active portion A in a vertical direction, and may basically serve to prevent damage to an internal electrode by physical or chemical stress.

Each of the upper cover portion C1 and the lower cover portion C2 may have a thickness of 20 µm or less, but an embodiment is not limited thereto.

In recent years, according to a high-performance as well as lightweight, thin, short, and small of an electrical and electronic equipment industry, the miniaturization, high performance, and ultra-high capacity have been required for an electronic component. Accordingly, as described above, thicknesses of upper and lower cover portions, disposed inside a ceramic body, have recently been reduced.

As in an embodiment, when each of the upper cover portion C1 and the lower cover portion C2 has a thickness of 20 µm or less, a thickness of a cover portion is small, so it is easy for moisture and a plating solution to penetrate from outside to the active region A. Thus, the possibility of moisture resistance reliability failure may be increased.

According to an embodiment, thicknesses for each position, of an electrode layer, disposed outside a ceramic body, and a plating layer thereon, are controlled, so moisture resistance reliability may be improved.

That is, in an embodiment, in an ultra-small high capacity multilayer ceramic capacitor, when each of the upper cover portion C1 and the lower cover portion C2 has a thin thickness, equal to or less than 20 µm, in order to improve moisture resistance reliability, a thickness of each of an electrode layer and a plating layer, included in an external electrode, is controlled for each position.

Thus, in the case of a multilayer ceramic capacitor according to the related art, in which a thickness of each of an upper cover portion C1 and a lower cover portion C2 exceeds 20 µm, moisture resistance reliability may not be significantly affected, even when a thickness for each position of each of an electrode layer and a plating layer is not controlled in a cross-section in a length-thickness direction and a cross-section in a width-thickness direction, as in an embodiment of the present disclosure.

Here, a material, forming the first and second internal electrodes 121 and 122, is not particularly limited. For example, the first and second internal electrodes 121 and 122 may be formed using a conductive paste containing at least one among silver (Ag), lead (Pb), platinum (Pt), nickel (Ni), and copper (Cu).

The multilayer ceramic capacitor according to an embodiment may include a first external electrode 131 electrically connected to the first internal electrode 121 and a second external electrode 132 electrically connected to the second internal electrode 122.

The first and second external electrodes 131 and 132 may be electrically connected to the first and second internal electrodes 121 and 122 for capacitance formation, and the second external electrode 132 may be connected to a potential different from that of the first external electrode 131.

The first and second external electrodes 131 and 132 may be disposed on the third surface S3 and the fourth surface S4 in a length direction, a second direction of the ceramic body 110, respectively, and may extend onto the first surface S1 and the second surface S2 in a thickness direction, a first direction of the ceramic body 110.

The external electrodes 131 and 132 are disposed outside the ceramic body 111, and may include electrode layers 131a and 132a electrically connected to the internal electrodes 121 and 122, first plating layers 131b and 132b disposed on the electrode layers 131a and 132a, and second plating layers 131c and 132c disposed on the first plating layers 131b and 132b, respectively.

The external electrodes 131 and 132 include a first external electrode 131 and a second external electrode 132, disposed on one side and the other side of the ceramic body 111, respectively.

The electrode layers 131a and 132a may include a conductive metal and glass.

The conductive metal, used for the electrode layers 131a and 132a, is not particularly limited as long as a material is electrically connected to the internal electrode for capacitance formation. For example, the conductive metal may be one or more selected from the group consisting of copper (Cu), silver (Ag), nickel (Ni), and alloys thereof.

The electrode layers 131a and 132a may be formed by sintering a conductive paste provided by adding glass frit to the conductive metal powder.

That is, the electrode layers 131a and 132a may be a sintering type electrode formed by sintering paste including a conductive metal.

The conductive metal, included in the electrode layers 131a and 132a, is electrically conducted with the first and second internal electrodes 121 and 122, thereby implementing electrical characteristics.

The glass, included in the electrode layers 131a and 132a, acts together with the conductive metal as a sealing material for blocking external moisture.

The first external electrode 131 includes: a first electrode layer 131a disposed on one surface of the ceramic body 110 in a length (L) direction, the second direction, and electrically connected to the first internal electrode 121; a first plating layer 131b disposed on the first electrode layer 131a; and a second plating layer 131c disposed on the first plating layer 131b.

Moreover, the second external electrode 132 includes: a second electrode layer 132a disposed on the other surface of the ceramic body 110 in a length (L) direction, the second direction, and electrically connected to the second internal electrode 122; a first plating layer 132b disposed on the second electrode layer 132a; and a second plating layer 132c disposed on the first plating layer 132b.

The electrode layers 131a and 132a are disposed on both side surfaces of the ceramic body 110 in a length (L) direction, and may extended onto portions of the first surface S1 and the second surface S2, which are an upper surface and a lower surface of the ceramic body 110.

In addition, plating layers 131b, 131c, 132b, and 132c may be disposed on upper portions of the electrode layers 131a and 132a.

The electrode layers 131a and 132a may be formed of the same conductive metal as that of the first and second internal electrodes 121 and 122, but are not limited thereto. For example, the electrode layers may be formed of one among copper (Cu), silver (Ag), nickel (Ni), and the like, or alloys thereof.

The first plating layers 131b and 132b are not particularly limited, and may be a nickel plating layer, while the second plating layers 131c and 132c, disposed on the first plating layers 131b and 132b, may be a tin plating layer.

According to an embodiment, in cross-sections of the ceramic body 110 in first and second directions, a thickness T1 of the electrode layers 131a and 132a corresponding to a central region of the ceramic body 110 in a thickness direction is 5 μm or more and 30 μm or less, a thickness T2 of the electrode layers 131a and 132a corresponding to a region in which an outermost internal electrode of the internal electrodes 121 and 122 is located is 5 μm or more and 15 μm or less, and a thickness T3 of the electrode layers 131a and 132a corresponding to a corner portion of the ceramic body 110 may be 0.1 μm or more and 10 μm or less.

The first direction is a thickness direction of the ceramic body 110, the second direction is a length direction of the ceramic body 110, and cross-sections of the ceramic body 110 in the first and second directions refer to cross-sections in a length-thickness direction.

It is controlled that a thickness T1 of the electrode layers 131a and 132a corresponding to a central region of the ceramic body 110 in a thickness direction is 5 μm or more and 30 μm or less, a thickness T2 of the electrode layers 131a and 132a corresponding to a region in which an outermost internal electrode of the internal electrodes 121 and 122 is located is 5 μm or more and 15 μm or less, and a thickness T3 of the electrode layers 131a and 132a corresponding to a corner portion of the ceramic body 110 may be 0.1 μm or more and 10 μm or less. Thus, moisture resistance reliability of a multilayer ceramic electronic component may be improved. The thickness T2 may be less than the thickness T1 and be greater than the thickness T3.

That is, in order to prevent degradation of moisture resistance reliability of a multilayer ceramic electronic component, it is required that a thickness T1 of the electrode layers 131a and 132a corresponding to a central region of the ceramic body 110 in a thickness direction is at least 5 μm, in cross-sections of the ceramic body 110 in first and second directions.

In addition, it is required that a thickness T2 of the electrode layers 131a and 132a corresponding to a region in which an outermost internal electrode, of the internal electrodes 121 and 122, is located is at least 5 μm.

Moreover, it is required that a thickness T3 of the electrode layers 131a and 132a corresponding to a corner portion of the ceramic body 110 is at least 0.1 μm.

In detail, after sintering, a thickness of the dielectric layer 111 may be 0.4 μm or less, and a thickness of each of the first and second internal electrodes 121 and 122 is 0.4 μm or less. Here, in the case of a product, to which the dielectric layer and the internal electrode having a thin film described above are applied, moisture resistance reliability may be degraded.

Here, a thickness of the dielectric layer 111 is 0.4 μm or less, and a thickness of each of the first and second internal electrodes 121 and 122 is 0.4 μm or less. In this case, as in an embodiment, in cross-sections of the ceramic body 110 in first and second directions, a thickness T1 of the electrode layers 131a and 132a corresponding to a central region of the ceramic body 110 in a thickness direction is controlled to be 5 μm or more, a thickness T2 of the electrode layers 131a and 132a corresponding to a region in which an outermost internal electrode, of the internal electrodes 121 and 122, is located is controlled to be 5 μm or more, and a thickness T3 of the electrode layers 131a and 132a corresponding to a corner portion of the ceramic body 110 is controlled to be 0.1 μm or more. Only when the thicknesses are controlled as described above, degradation of moisture resistance reliability may be prevented.

If a thickness T1 of each of the electrode layers 131a and 132a corresponding to a central region of the ceramic body 110 in a thickness direction is less than 5 μm, moisture resistance reliability may be degraded.

Moreover, if a thickness T2 of each of the electrode layers 131a and 132a corresponding to a region in which an outermost internal electrode, of the internal electrodes 121 and 122, is located is less than 5 μm, moisture resistance reliability may be degraded.

In addition, if a thickness T3 of each of the electrode layers 131a and 132a corresponding to a corner portion of the ceramic body 110 is less than 0.1 μm, moisture resistance reliability may be degraded.

In detail, if a thickness of the dielectric layer 111 is 0.4 μm or less, and a thickness of each of the first and second internal electrodes 121 and 122 is 0.4 μm or less, and a thickness of each of the electrode layers 131a and 132a in each region is less than the respective value described above, moisture resistance reliability may be degraded.

Here, the meaning of the thin film is not that a thickness of the dielectric layer 111 and each of the first and second internal electrodes 121 and 122 is 0.4 μm or less, and may be understood as the concept of including the dielectric layer and the internal electrode, having a reduced thickness, as compared with the product according to the related art.

On the other hand, in cross-sections of the ceramic body 110 in first and second directions, a thickness T1 of the electrode layers 131a and 132a corresponding to a central region of the ceramic body 110 in a thickness direction exceeds 30 μm, a thickness T2 of the electrode layers 131a and 132a corresponding to a region in which an outermost internal electrode, of the internal electrodes 121 and 122, is located exceeds 15 μm, and a thickness T3 of the electrode layers 131a and 132a corresponding to a corner portion of the ceramic body 110 exceeds 10 μm. In this case, moisture resistance reliability may be improved. However, a high-capacity multilayer ceramic electronic component cannot be implemented.

In cross-sections of the ceramic body 110 in first and second directions, among a thickness T1 of the electrode layers 131a and 132a corresponding to a central region of the ceramic body 110 in a thickness direction, a thickness T2 of the electrode layers 131a and 132a corresponding to a region in which an outermost internal electrode, of the internal electrodes 121 and 122, is located, and a thickness T3 of the electrode layers 131a and 132a corresponding to a corner portion of the ceramic body 110, if any number among the thicknesses is outside of a numerical range according to an embodiment of the present disclosure, moisture resistance reliability may be degraded.

According to an embodiment, in a 1005 size (Length×Width: 1.0 mm×0.5 mm) or less of the multilayer ceramic electronic component 100, a thickness T1 of each of the electrode layers 131a and 132a corresponding to a central region of the ceramic body 110 in a thickness direction may be 15 μm or more and 30 μm or less.

Moreover, in the 1005 size (Length×Width: 1.0 mm×0.5 mm) or less of the multilayer ceramic electronic component 100, a thickness T2 of each of the electrode layers 131a and 132a corresponding to a region in which an outermost internal electrode, of the internal electrodes 121 and 122, is located may be 5 μm or more and 15 μm or less.

Moreover, in the 1005 size (Length×Width: 1.0 mm×0.5 mm) or less of the multilayer ceramic electronic component 100, a thickness T3 of each of the electrode layers 131a and 132a corresponding to a corner portion of the ceramic body 110 may be 1 μm or more and less than 9 μm.

In an embodiment, in the 1005 size (Length×Width: 1.0 mm×0.5 mm) or less of the multilayer ceramic electronic component 100, a thickness of each of the electrode layers 131a and 132a in the each region satisfies the respective numerical range, so moisture resistance reliability of a ultra-small and high capacity multilayer ceramic electronic component may be improved.

In the 1005 size (Length×Width: 1.0 mm×0.5 mm) or less of the multilayer ceramic electronic component 100, if a thickness T1 of each of the electrode layers 131a and 132a corresponding to a central region of the ceramic body 110 in a thickness direction is less than 15 μm, moisture resistance reliability may be degraded.

Moreover, in the 1005 size (Length×Width: 1.0 mm×0.5 mm) or less of the multilayer ceramic electronic component 100, if a thickness T2 of each of the electrode layers 131a and 132a corresponding to a region in which an outermost internal electrode, of the internal electrodes 121 and 122, is located is less than 5 μm, moisture resistance reliability may be also degraded.

In addition, in the 1005 size (Length×Width: 1.0 mm×0.5 mm) or less of the multilayer ceramic electronic component 100, if a thickness T3 of each of the electrode layers 131a and 132a corresponding to a corner portion of the ceramic body 110 is less than 1 μm, moisture resistance reliability may be degraded. The thickness T2 may be less than the thickness T1 and be greater than the thickness T3.

On the other hand, in the 1005 size (Length×Width: 1.0 mm×0.5 mm) or less of the multilayer ceramic electronic component 100, a thickness T1 of the electrode layers 131a and 132a corresponding to a central region of the ceramic body 110 in a thickness direction exceeds 25 μm, a thickness T2 of the electrode layers 131a and 132a corresponding to a region in which an outermost internal electrode, of the internal electrodes 121 and 122, is located exceeds 15 μm, and a thickness T3 of the electrode layers 131a and 132a corresponding to a corner portion of the ceramic body 110 is 9 μm or more. In this case, moisture resistance reliability may be improved. However, a high-capacity multilayer ceramic electronic component cannot be implemented.

In an embodiment, the 1005 size (Length×Width: 1.0 mm×0.5 mm) or less may refer to a 1005 size (Length×Width: 1.0 mm×0.5 mm) and a 0603 size (Length×Width: 0.6 mm×0.3 mm), but an embodiment is not limited thereto and the 1005 size or less may be applied to a size equal to or less than the same.

According to an embodiment, a thickness T1b of each of the first plating layers 131b and 132b corresponding to a central region of the ceramic body 110 in a thickness direction may be 3 μm to 5 μm.

If a thickness T1b of each of the first plating layers 131b and 132b corresponding to a central region of the ceramic body 110 in a thickness direction is less than 3 μm, a frequency of plating interruption may be increased, so reliability may be degraded.

If a thickness T1b of each of the first plating layers 131b and 132b corresponding to a central region of the ceramic body 110 in a thickness direction exceeds 5 μm, a high capacity multilayer ceramic electronic component may not be implemented.

Hereinafter, a method of manufacturing a multilayer ceramic capacitor according to an embodiment will be described.

According to an embodiment, a plurality of ceramic green sheets may be provided.

Regarding a ceramic green sheet, a ceramic powder, a binder, and a solvent are mixed to prepare slurry, and the slurry is manufactured as a sheet having a thickness of several μm using a doctor blade method. Then, the ceramic green sheet is sintered, and then may form a dielectric layer 111 as illustrated in FIG. 2.

A thickness of the ceramic green sheet may be 0.6 μm or less, and thus a thickness of a dielectric layer after sintering may be 0.4 μm or less.

Then, a conductive paste for an internal electrode is applied on the ceramic green sheet to form an internal electrode pattern. The internal electrode pattern may be formed using screen printing or gravure printing.

The conductive paste for an internal electrode includes a conductive metal and an additive, and the additive may be one or more between non-metallic and metallic oxides.

The conductive metal may include nickel. The additive, may include barium titanate or strontium titanate as a metallic oxide.

A thickness of the internal electrode pattern may be 0.5 μm or less, and thus a thickness of an internal electrode after sintering may be 0.4 μm or less.

Then, ceramic green sheets with the internal electrode pattern formed therein are stacked, and then pressed in a stacking direction, so the ceramic green sheets may be pressed. Thus, a ceramic laminate having an internal electrode pattern formed therein may be manufactured.

Then, a ceramic laminate may be cut for each region corresponding to a single capacitor to be provided as a chip.

In this case, cutting may be performed to allow one end of the internal electrode pattern to be alternately exposed through a side surface.

Then, a laminate, provided as a chip, is sintered to manufacture a ceramic body.

The sintering process may be performed in a reducing atmosphere.

Moreover, the sintering process may be performed by controlling a heating rate. An embodiment is not particularly limited, and the heating rate may be 30° C./60 s to 50° C./60 s at 700° C. or less.

Then, an external electrode may be formed to be electrically connected to an internal electrode exposed to a side surface of a ceramic body, while covering the side surface of the ceramic body. Then, a plating layer such as nickel, tin, or the like, may be formed on a surface of the external electrode.

Hereinafter, the present disclosure will be described in detail with reference to the Example and the Comparative Example.

A multilayer ceramic capacitor according to the Example and the Comparative Example was prepared in the following manner.

Barium titanate powder, ethanol as an organic solvent, and polyvinyl butyral as a binder were mixed, and then ball milling was performed to manufacture ceramic slurry, and a ceramic green sheet was manufactured using the ceramic slurry.

A conductive paste for an internal electrode containing nickel was printed on a ceramic green sheet to form an internal electrode, and internal electrodes were stacked to obtain a green laminate. Then, the green laminate was isostatic pressed at a pressure of 1,000 kgf/cm² at 85° C.

The pressed green laminate was cut to manufacture a green chip, and the cut green chip was maintained for 60 hours at 230° C. under atmospheric conditions in a de-binder process. After the de-binder process, the green chip was sintered at 1000° C. to manufacture a sintered chip. Sintering was performed in a reducing atmosphere to prevent oxidation of an internal electrode, and the reducing atmosphere was provided to be $10^{-11}$ atm to $10^{-10}$ atm, lower than the Ni/NiO equilibrium oxygen partial pressure.

A paste for an external electrode including copper powder and glass powder was used to form an electrode layer outside a sintered chip, and a nickel plating layer and a tin plating layer were formed by electroplating on the electrode layer.

A multilayer ceramic capacitor having a 1005 size was manufactured according to the above method. In the 1005 size, a length and a width are 1.0 mm±0.1 mm and 0.5 mm±0.1 mm, respectively. Characteristics of the multilayer ceramic capacitor were evaluated as follows.

In Table 1, measurement results of a capacity increase rate, a frequency of plating interruption, a high temperature/high pressure reliability failure frequency, and a moisture resistance reliability failure frequency were compared according to a thickness of an electrode layer for each position in Comparative Example and Example.

400 samples of each of Comparative Example and Example were selected, and the evaluation of the high temperature/high pressure reliability failure frequency and the moisture resistance reliability failure frequency was performed according to a thickness for each position.

The high temperature/high pressure reliability evaluation was performed under conditions of 2 Vr and 150° C., and the moisture resistance reliability evaluation was performed under conditions of 1 Vr and 8585 (85° C. and relative humidity 850%).

TABLE 1

| | T1 (μm) | T2 (μm) | T3 (μm) | Capacity Increase Rate (%) | Frequency of Plating Interruption | High Temperature/ High Pressure Reliability Failure Frequency | Moisture Resistance Reliability Failure Frequency |
|---|---|---|---|---|---|---|---|
| 1* | 4 | 5 | 1 | +9.0 | 0/100 | 8/400 | 7/400 |
| 2* | 10 | 5 | 1 | +8.0 | 0/100 | 5/400 | 0/400 |
| 3 | 15 | 5 | 1 | +7.0 | 0/100 | 0/400 | 0/400 |
| 4* | 20 | 1 | 1 | +5.0 | 0/100 | 1/400 | 0/400 |
| 5* | | 3 | 1 | | 1/100 | 0/400 | 1/400 |
| 6* | | 5 | 0.1 | | 99/100 | 14/400 | 12/400 |
| 7* | | 5 | 0.5 | | 78/100 | 8/400 | 4/400 |
| 8 | | 5 | 1 | | 0/100 | 0/400 | 0/400 |
| 9 | | 5 | 3 | | 0/100 | 0/400 | 0/400 |
| 10 | | 10 | 1 | | 0/100 | 0/400 | 0/400 |
| 11 | | 15 | 1 | | 0/100 | 0/400 | 0/400 |
| 12 | 30 | 5 | 1 | +2.0 | 0/100 | 0/400 | 0/400 |
| 13 | | 10 | 1 | | 0/100 | 0/400 | 0/400 |
| 14* | 40 | 5 | 1 | 0.0 | 0/100 | 0/400 | 0/400 |
| 15* | | 10 | 1 | | 0/100 | 0/400 | 0/400 |

*Comparative Example

Referring to Table 1, in a 1005 size (Length×Width: 1.0 mm×0.5 mm) or less, a sample 1, Comparative Example, is the case in which a thickness T1 of the electrode layer corresponding to a central region of a ceramic body in a thickness direction is 4 μm, which is less than 5 μm. In this case, although a capacity increase rate is high, the high temperature/high pressure reliability and moisture resistance reliability failure frequency may be high, so it can be seen that there is a problem in reliability.

Moreover, in the 1005 size (Length×Width: 1.0 mm×0.5 mm) or less, a sample 2, Comparative Example, is the case in which the sum T1 of thicknesses of the electrode layer and the first plating layer corresponding to a central region of a ceramic body in a thickness direction is 10 μm, which is less than 15 μm. In this case, although a capacity increase rate is high, the high temperature/high pressure reliability failure frequency may be high, so it can be seen that there is a problem in reliability.

In addition, in the 1005 size (Length×Width: 1.0 mm×0.5 mm) or less, samples 14 and 15, Comparative Example, are the case in which a thickness T1 of the electrode layer corresponding to a central region of the ceramic body in a thickness direction is 40 μm, which exceeds 30 μm. In this case, there is no problem of moisture resistance reliability, but a capacity increase rate is 0%, so a high capacity multilayer ceramic electronic component may not be implemented.

Moreover, in the 1005 size (Length×Width: 1.0 mm×0.5 mm) or less, samples 4 to 7, Comparative Example, are the case in which a thickness T2 of the electrode layer corresponding to a region in which an outermost internal electrode, of the internal electrode, is located, and a thickness T3 of the electrode layer corresponding to a corner portion of the ceramic body are outside of a numerical range according to an embodiment of the present disclosure. In this case, many failures occur at the frequency of plating interruption, the high temperature/high pressure reliability failure frequency, and the moisture resistance reliability failure frequency, so it can be seen that there is a problem in reliability.

On the other hand, in the 1005 size (Length×Width: 1.0 mm×0.5 mm) or less, a sample 3 and samples 8 to 13 are the case in which it is satisfied with a numerical range according to an embodiment of the present disclosure. In this case, it can be seen that a high capacity multilayer ceramic capacitor with excellent moisture resistance reliability may be implemented.

As set forth above, according to an embodiment in the present disclosure, a thickness of a sintered electrode layer including a conductive metal and glass, of an external electrode, is controlled by position, so moisture resistance characteristics can be improved and reliability can be improved.

While exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising:
    a ceramic body including a dielectric layer and a plurality of internal electrodes disposed to oppose each other with the dielectric layer interposed therebetween, and having a first surface and a second surface opposing each other in a thickness direction of the ceramic body, a third surface and a fourth surface connected to the first surface and the second surface, and opposing each other in a length direction of the ceramic body, and a fifth surface and a sixth surface connected to the first surface to the fourth surface, and opposing each other in a width direction of the ceramic body; and
    an external electrode disposed outside the ceramic body, and electrically connected to one or more of the plurality of internal electrodes,
    wherein the external electrode includes an electrode layer electrically connected to the one or more of the plurality of internal electrodes, a first plating layer disposed on the electrode layer, and a second plating layer disposed on the first plating layer,
    a thickness T1 of the electrode layer corresponding to a central region of the ceramic body in the thickness direction is 5 µm or more and 30 µm or less, a thickness T2 of the electrode layer corresponding to a region in which an outermost internal electrode, of the internal electrodes, is located is 5 µm or more and 15 µm or less, and a thickness T3 of the electrode layer corresponding to a corner portion of the ceramic body is more than 0.1 µm and less than 10 µm, in a cross-section of the ceramic body in the thickness and length directions, and
    a thickness of the dielectric layer is 0.4 µm or less, and a thickness of one of the plurality of the internal electrodes is 0.4 µm or less.

2. The multilayer ceramic electronic component of claim 1, wherein a size of the multilayer ceramic electronic component is a 1005 size (Length×Width: 1.0 mm×0.5 mm) or less, and the thickness T1 is 15 µm or more and 30 µm or less.

3. The multilayer ceramic electronic component of claim 1, wherein a size of the multilayer ceramic electronic component is a 1005 size (Length×Width: 1.0 mm×0.5 mm) or less.

4. The multilayer ceramic electronic component of claim 1, wherein a size of the multilayer ceramic electronic component is a 1005 size (Length×Width: 1.0 mm×0.5 mm) or less, and the thickness T3 is 1 µm or more and less than 9 µm.

5. The multilayer ceramic electronic component of claim 1, wherein a thickness T1b of the first plating layer corresponding to the central region of the ceramic body in the thickness direction is 3 µm to 5 µm.

6. The multilayer ceramic electronic component of claim 1, wherein the electrode layer is a sintered electrode including a conductive metal and glass.

7. The multilayer ceramic electronic component of claim 1, wherein the thickness T2 is less than the thickness T1 and is greater than the thickness T3.

8. A multilayer ceramic electronic component, comprising:
    a ceramic body including a dielectric layer and a plurality of internal electrodes disposed to oppose each other with the dielectric layer interposed therebetween, and having a first surface and a second surface opposing each other in a thickness direction of the ceramic body, a third surface and a fourth surface connected to the first surface and the second surface, and opposing each other in a length direction of the ceramic body, and a fifth surface and a sixth surface connected to the first surface to the fourth surface, and opposing each other in a width direction of the ceramic body; and
    an external electrode disposed outside the ceramic body, and electrically connected to one or more of the plurality of internal electrodes,
    wherein the external electrode includes an electrode layer electrically connected to the one or more of the plurality of internal electrodes, a first plating layer disposed directly on the electrode layer, and a second plating layer disposed on the first plating layer,
    a thickness T1 of the electrode layer corresponding to a central region of the ceramic body in the thickness direction is 5 µm or more and 30 µm or less, a thickness T2 of the electrode layer corresponding to a region in which an outermost internal electrode, of the internal electrode, is located is 5 µm or more and 15 µm or less in a cross-section of the ceramic body in the thickness and length directions,
    the ceramic body includes an active portion forming capacity and including the plurality of internal electrodes disposed to oppose each other with the dielectric layer interposed therebetween, and cover portions disposed on an upper portion and a lower portion of the active portion, respectively, and
    a thickness of each of the cover portions is 20 µm or less.

9. The multilayer ceramic electronic component of claim 8, wherein a size of the multilayer ceramic electronic component is a 1005 size (Length×Width: 1.0 mm×0.5 mm) or less, and the thickness T1 is 15 µm or more and 30 µm or less.

10. The multilayer ceramic electronic component of claim 8, wherein a size of the multilayer ceramic electronic component is a 1005 size (Length×Width: 1.0 mm×0.5 mm) or less.

11. The multilayer ceramic electronic component of claim 8, wherein a size of the multilayer ceramic electronic component is a 1005 size (Length×Width: 1.0 mm×0.5 mm) or less, and a thickness T3 of the electrode layer corresponding to a corner portion of the ceramic body is 1 µm or more and less than 9 µm.

12. The multilayer ceramic electronic component of claim 8, wherein a thickness T1b of the first plating layer corresponding to the central region of the ceramic body in the thickness direction is 3 µm to 5 µm.

13. The multilayer ceramic electronic component of claim 8, wherein the electrode layer is a sintered electrode including a conductive metal and glass.

14. The multilayer ceramic electronic component of claim 8, wherein the thickness T2 is less than the thickness T1 and is greater than a thickness T3, in which T3 is a thickness of the electrode layer corresponding to a corner portion of the ceramic body.

15. The multilayer ceramic electronic component of claim 8, wherein an average thickness of the dielectric layer is 0.4 μm or less.

16. The multilayer ceramic electronic component of claim 8, wherein an average thickness of one of the plurality of the internal electrodes is 0.4 μm or less.

17. The multilayer ceramic electronic component of claim 8, wherein an average thickness of the dielectric layer is 0.4 μm or less, and an average thickness of one of the plurality of the internal electrodes is 0.4 μm or less.

18. A multilayer ceramic electronic component, comprising:
a ceramic body including a dielectric layer and a plurality of internal electrodes disposed to oppose each other with the dielectric layer interposed therebetween, and having a first surface and a second surface opposing each other in a thickness direction of the ceramic body, a third surface and a fourth surface connected to the first surface and the second surface, and opposing each other in a length direction of the ceramic body, and a fifth surface and a sixth surface connected to the first surface to the fourth surface, and opposing each other in a width direction of the ceramic body; and
an external electrode disposed outside the ceramic body, and electrically connected to one or more of the plurality of internal electrodes,
wherein the external electrode includes an electrode layer electrically connected to the one or more of the plurality of internal electrodes, a first plating layer disposed on the electrode layer, and a second plating layer disposed on the first plating layer,
a thickness T1 of the electrode layer corresponding to a central region of the ceramic body in the thickness direction is 5 μm or more and 30 μm or less, a thickness T2 of the electrode layer corresponding to a region in which an outermost internal electrode, of the internal electrodes, is located is 5 μm or more and 15 μm or less in a cross-section of the ceramic body in the thickness and length directions, and
a thickness T1*b* of the first plating layer corresponding to the central region of the ceramic body in the thickness direction is 3 μm to 5 μm.

19. The multilayer ceramic electronic component of claim 18, wherein an average thickness of the dielectric layer is 0.4 μm or less.

20. The multilayer ceramic electronic component of claim 18, wherein an average thickness of one of the plurality of the internal electrodes is 0.4 μm or less.

* * * * *